United States Patent
Suzuki et al.

(10) Patent No.: US 10,636,446 B2
(45) Date of Patent: Apr. 28, 2020

(54) MAGNETIC DISK DEVICE AND HEAD POSITIONING METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventors: Hiroyuki Suzuki, Kamakura Kanagawa (JP); Hideo Sado, Kamakura Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/282,456

(22) Filed: Feb. 22, 2019

(65) Prior Publication Data

US 2020/0082848 A1   Mar. 12, 2020

(30) Foreign Application Priority Data

Sep. 11, 2018   (JP) .................................. 2018-169816

(51) Int. Cl.
| | |
|---|---|
| *G11B 5/54* | (2006.01) |
| *G11B 17/34* | (2006.01) |
| *G11B 5/012* | (2006.01) |
| *G11B 5/58* | (2006.01) |

(52) U.S. Cl.
CPC .............. *G11B 17/34* (2013.01); *G11B 5/012* (2013.01)

(58) Field of Classification Search
CPC .......... G11B 5/4976; G11B 5/54; G11B 5/02; G11B 5/09; G11B 19/02; G11B 5/59627; G11B 5/48; G11B 5/49; G11B 5/4969; G11B 5/59633
USPC ........ 360/27, 29, 39, 53, 55, 68, 75, 70, 71, 360/77.02, 78.04, 77.01
See application file for complete search history.

(56) References Cited

U.S. PATENT DOCUMENTS

| | | | |
|---|---|---|---|
| 8,902,536 B1 | 12/2014 | Hwang et al. | |
| 9,286,926 B1 | 3/2016 | Dhanda et al. | |
| 9,583,131 B1* | 2/2017 | Sugiyama | G11B 5/59627 |
| 9,672,850 B2* | 6/2017 | Grundvig | G06F 16/245 |
| 9,972,349 B1* | 5/2018 | French, Jr. | G11B 5/012 |
| 2003/0156347 A1* | 8/2003 | Ishii | G11B 5/5521 360/78.04 |
| 2010/0020435 A1* | 1/2010 | Chen | B82Y 10/00 360/77.02 |

* cited by examiner

*Primary Examiner* — Nabil Z Hindi
(74) *Attorney, Agent, or Firm* — White & Case LLP

(57) ABSTRACT

According to one embodiment, a magnetic disk device includes a disk, a head including a write head configured to write data on the disk, a first read head, and a second read head each configured to read data from the disk, and a controller configured to detect a first error of each track pitch corresponding to each track of the disk on the basis of a first gap in a radial direction between the first read head and the second read head at each position in the radial direction of the disk, write a servo pattern on the disk on the basis of a first correction value used to correct the first error, and position the head on the basis of the servo pattern.

18 Claims, 9 Drawing Sheets

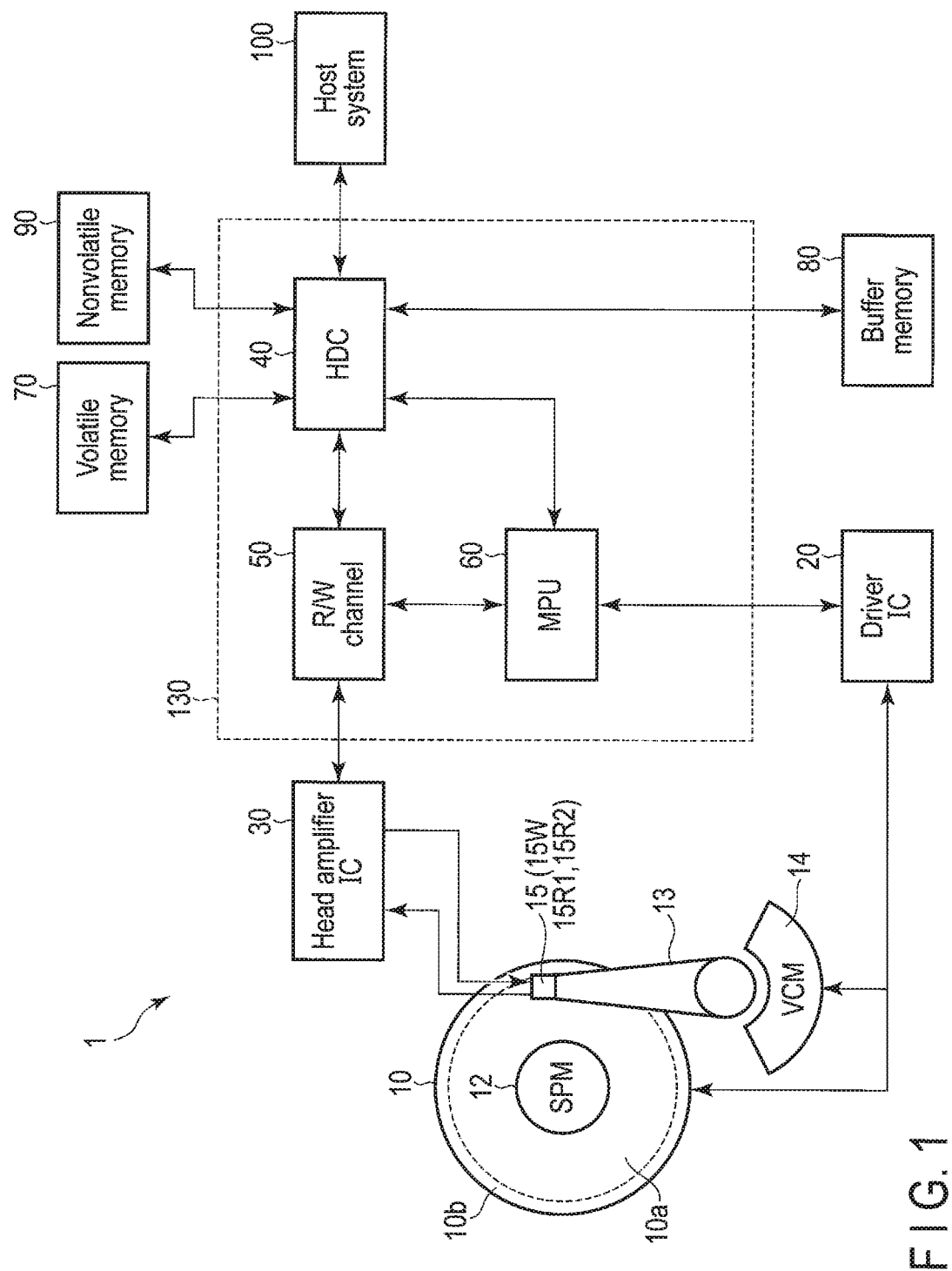
F I G. 1

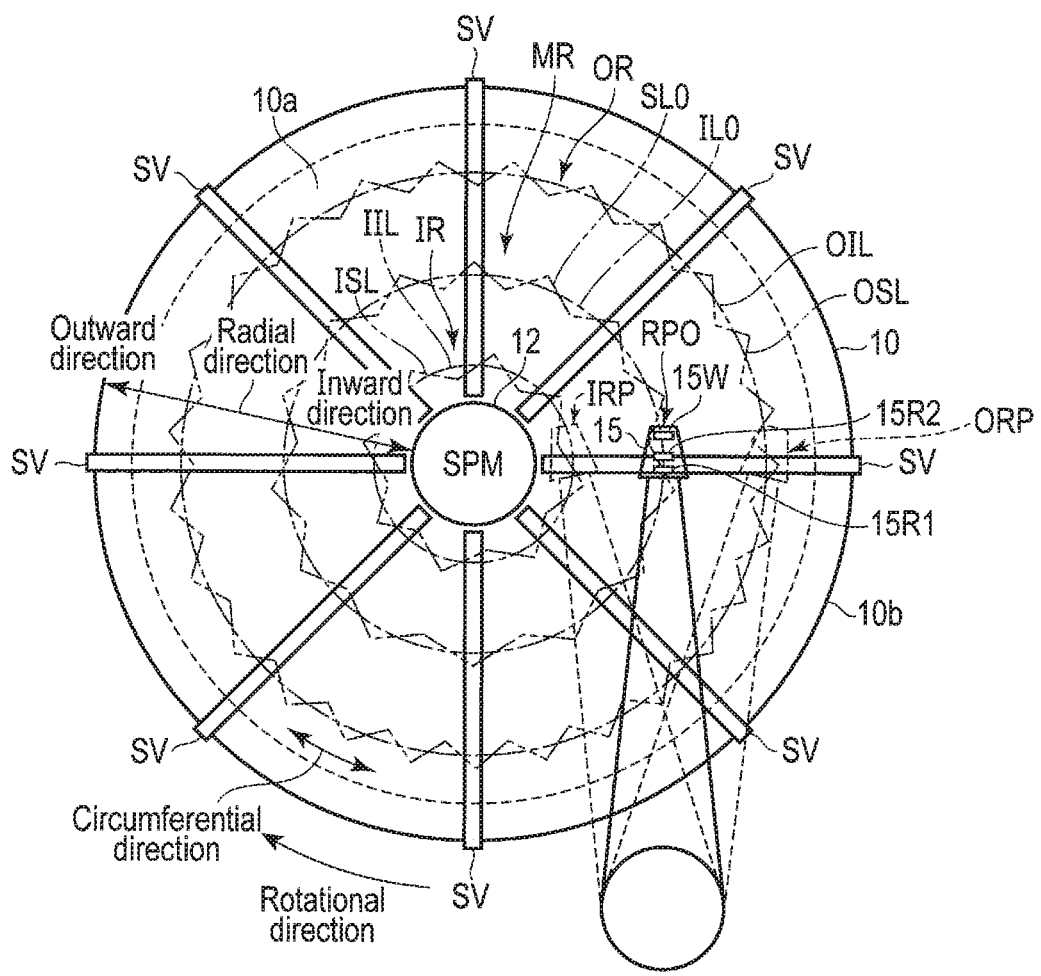
F I G. 2

MAGNETIC DISK DEVICE AND HEAD POSITIONING METHOD

CROSS-REFERENCE TO RELATED APPLICATIONS

This application is based upon and claims the benefit of priority from Japanese Patent Application No. 2018-169816, filed Sep. 11, 2018, the entire contents of which are incorporated herein by reference.

FIELD

Embodiments described herein relate generally to a magnetic disk device and head positioning method.

BACKGROUND

There is a magnetic disk device configured to execute processing of writing a servo pattern, for example, Self Servo Write (SSW). When writing a servo pattern by SSW, the magnetic disk device writes an experimental servo pattern on the disk. After writing the experimental servo pattern, the magnetic disk device detects a radial position of the disk at which the experimental servo pattern can optimally be read to thereby estimate an error of the track pitch. On the other hand, in recent years, a magnetic disk device of a Two-Dimensional Magnetic Recording (TDMR) system including a plurality of read heads has been developed.

BRIEF DESCRIPTION OF THE DRAWINGS

FIG. 1 is a block diagram showing the configuration of a magnetic disk device according to an embodiment;

FIG. 2 is a schematic diagram showing an example of arrangement of a head relative to a disk according to the embodiment;

DETAILED DESCRIPTION

Figure 3:
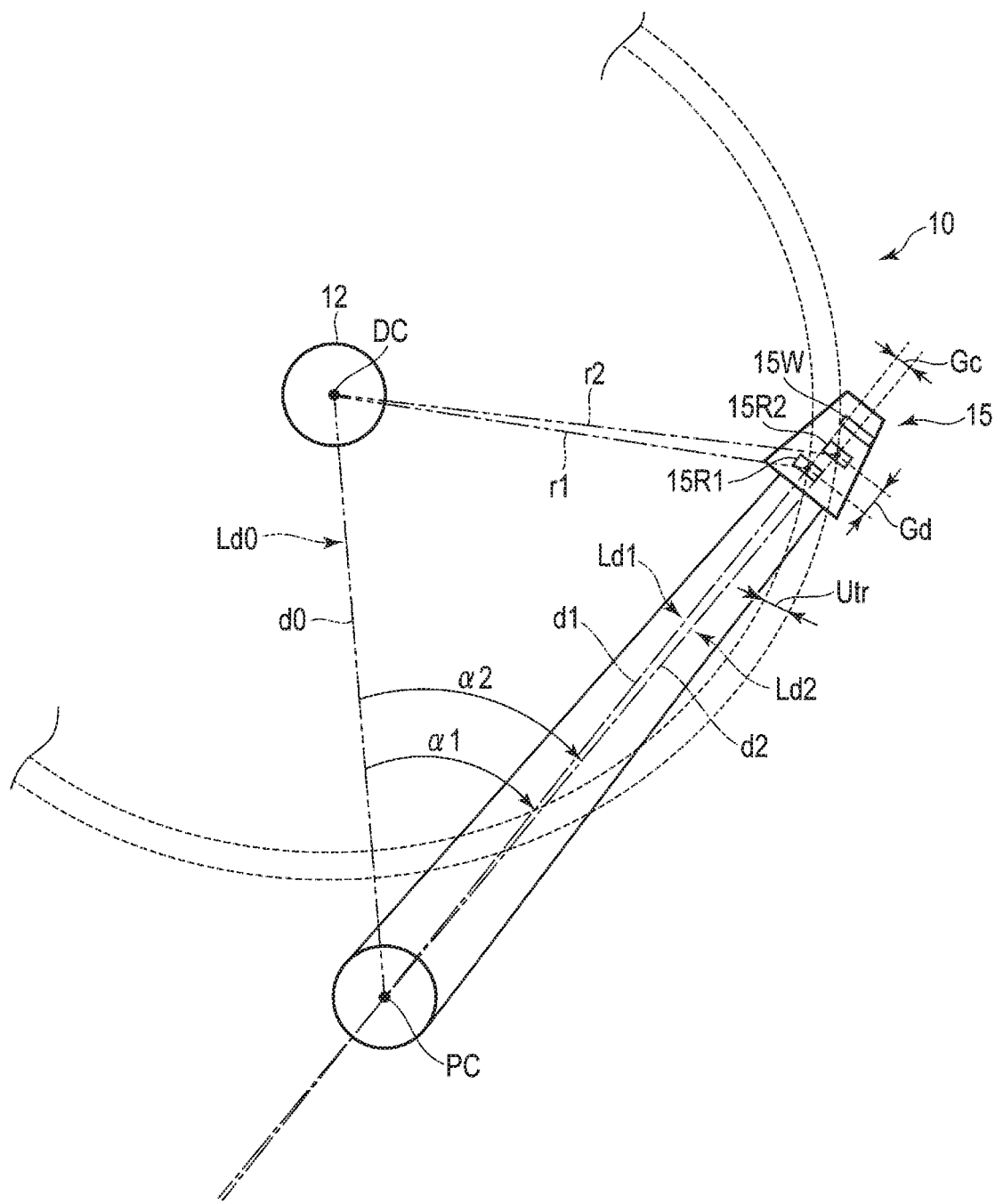
FIG. 3 is a view showing an example of geometric arrangement of the magnetic disk device according to the embodiment.

In general, according to one embodiment, a magnetic disk device comprises: a disk; a head including a write head configured to write data on the disk, a first read head, and a second read head each configured to read data from the disk; and a controller configured to detect a first error of each track pitch corresponding to each track of the disk on the basis of a first gap in a radial direction between the first read head and the second read head at each position in the radial direction of the disk, write a servo pattern on the disk on the basis of a first correction value used to correct the first error, and position the head on the basis of the servo pattern.

According to another embodiment, a head positioning method to be applied to a magnetic disk device comprising a disk, and a head including a write head configured to write data on the disk, a first read head, and a second read head each configured to read data from the disk comprises: detecting a first error of each track pitch corresponding to each track of the disk on the basis of a first gap in a radial direction between the first read head and the second read head at each position in the radial direction of the disk; writing a servo pattern on the disk on the basis of a first correction value used to correct the first error; and positioning the head on the basis of the servo pattern.

Hereinafter, an embodiment will be described with reference the accompanying drawings. It should be noted that each drawing has been presented by way of example only, and is not intended to limit the scope of the invention.

Embodiment

FIG. 1 is a block diagram showing the configuration of a magnetic disk device 1 according to an embodiment.

The magnetic disk device 1 is provided with a head/disk assembly (HDA) to be described later, driver IC 20, head amplifier integrated circuit (hereinafter referred to as a head amplifier IC or preamplifier) 30, volatile memory 70, buffer memory (buffer) 80, nonvolatile memory 90, and system controller 130 which is a one-chip integrated circuit. Further, the magnetic disk device 1 is connected to a host system (host) 100. The magnetic disk device 1 is a magnetic disk device of, for example, a Two-Dimensional Magnetic Recording (TDMR) system.

The HDA includes a magnetic disk (hereinafter referred to as a disk) 10, spindle motor (SPM) 12, arm 13 on which a head 15 is mounted, and voice coil motor (VCM) 14. The disk 10 is attached to the spindle motor 12, and is rotated by the drive of the spindle motor 12. The arm 13 and VCM 14 constitute an actuator. The actuator controls movement of the head 15 mounted on the arm 13 to a particular position in the radial direction (hereinafter simply referred to as a radial position). Two or more disks 10 and heads 15 may be provided. It should be noted that a particular position in the radial direction of something other than the disk 10 is called a radial position in some cases.

On the disk 10, a user data region 10*a* which the user can utilize and system region 10*b* to which information necessary for system management is to be written are allocated to a recording region thereof. Hereinafter, a direction along a circumference of the disk 10 is called a circumferential direction, and direction intersecting the circumferential direction is called a radial direction. Hereinafter, data written on a track of the disk 10, particular radial position of the disk 10, center position (hereinafter referred to as a track center) of a width (hereinafter simply referred to as a track width) of a particular track of the disk 10 in the radial direction, particular radial position or the like within a track width of a particular track of the disk 10 is simply called a track in some cases.

The head 15 has a slider as a main body, and is provided with a write head 15W and read heads 15R1 and 15R2 which are mounted on the slider. The write head 15W writes data on the disk 10. The read heads 15R1 and 15R2 read data recorded on the disk 10. The read head 15R1 is provided at, for example, a farthest position from the write head 15W. The read head 15R2 is provided at, for example, a farthest position from the write head 15W next to the read head 15R1. In other words, the read head 15R2 is positioned between the write head 15W and read head 15R1. It should be noted that three or more read heads may be provided. Hereinafter, the magnetic disk device 1 will be described on the assumption that the head 15 is positioned at a particular radial position or particular track with reference to the read head 15R1. It should be noted that in the magnetic disk device 1, the head 15 may be positioned at a particular radial position or particular track with reference to a read head other than the read head 15R1, for example, the read head 15R2. Hereinafter, in the magnetic disk device 1, a read head used as a reference at the time of positioning of the head 15 within a plurality of read tracks is called a reference read head.

FIG. 2 is a schematic diagram showing an example of arrangement of the head 15 relative to the disk 10 according to the embodiment. As shown in FIG. 2, a direction to the outer circumference of the disk 10 in the radial direction is called an outward direction (outer side), and a direction opposite to the outward direction is called an inward direction (inner side). Further, in FIG. 2, the rotational direction of the disk 10 is shown. It should be noted that the rotational direction may be reversed. In FIG. 2, the user data region 10*a* is divided into an inner circumferential region IR positioned on the inner side, outer circumferential region OR positioned on the outer side, and medium circumferential region MR positioned between the inner circumferential region IR and outer circumferential region OR. In the example shown in FIG. 2, a radial position IRP, radial position RP0, and radial position ORP are shown. The radial position IRP is a position on the inner side of the radial position RP0, and the radial position ORP is a position on the outer side of the radial position RP0. In the example shown in FIG. 2, the radial position RP0 is in the medium circumferential region MR, radial position ORP is in the outer circumferential region OR, and radial position IRP is in the inner circumferential region IR. It should be noted that the radial position RP0 may be in the outer circumferential region OR or may be in the inner circumferential region IR. The radial position IRP corresponds to a track center IIL of a particular track of the inner circumferential region IR, radial position RP0 corresponds to a track center ILO of a particular track of the medium circumferential region MR, and radial position ORP corresponds to a track center OIL of a particular track of the outer circumferential region OR. The track center IIL corresponds to a target locus or path (hereinafter referred to as a target locus or target path in some cases) of the head 15 in a particular track, for example, a particular track of the inner circumferential region IR. The track center ILO corresponds to a target path (target locus) of the head 15 in a particular track, for example, a particular track of the medium circumferential region MR. The track center OIL corresponds to a target path (target locus) of the head 15 in a particular track, for example, a particular track of the outer circumferential region OR. For example, each of the track centers IIL, ILO, and OIL is a true circle. The track centers IIL, ILO, and OIL are arranged concentric with the disk 10. Each of the track centers IIL, ILO, and OIL arranged concentric with the disk 10 as described above is called a target track in some cases. Further, in FIG. 2, paths ISL, SLO, and OSL of the head 15 respectively deviated from the track centers IIL, ILO, and OIL due to Repeatable Run Out (RRO) are shown.

The disk 10 has a plurality of servo patterns SVs. Hereinafter, the servo pattern SV is called a servo sector or servo region in some cases. The plurality of servo patterns SVs are discretely arranged at particular intervals in the circumferential direction in such a manner as to radially extend in the radial directions. Each servo pattern SV includes servo data used to position the head 15 at a particular radial position of the disk 10 and RRO correction data.

The servo data includes, for example, a Servo Mark, address data, burst data, and the like. The address data is constituted of an address (cylinder address) of a particular track, and address of a servo sector of a particular track. The burst data is data (relative position data) used to detect a positional difference (positional error) of the head 15 in the radial direction from a track center of a particular track, and is constituted of a repetitive pattern of a particular period. The burst data is written in such a manner as to straddle externally adjacent tracks in a staggered arrangement. The burst data includes an error resulting from a warp in a track relative to the target track caused by the RRO in synchronism with the rotation of the disk 10 at the time when the servo data is written on the disk. Hereinafter, for convenience of explanation, the error resulting from a warp in a track relative to the target track caused by the RRO is simply called RRO.

On each of the plurality of servo patterns SVs, a pattern (hereinafter simply referred to as RRO correction data) constituting RRO correction data used to correct the RRO is written. The RRO correction data is a kind of additional data of servo data. The RRO correction data is used for correction of the RRO of the servo data (more specifically, servo burst data in the servo data), i.e., for correction of a warp in the path of the head 15 relative to the target track. The correction of the RRO is called true circle correction in some cases.

The RRO correction data includes an RRO preamble pattern, synchronous pattern, and digital data (referred to as an RRO correction code (RRO Code)) obtained by encoding a correction amount. The RRO preamble pattern, and synchronous pattern are used to detect read start timing of digital data obtained by encoding a correction amount to be written to the subsequent region. At this time, the RRO correction code (RRO Code) constitutes the principal part of the RRO correction data. Such RRO correction data is called an RRO bit or Post Code in some cases.

When the head 15 is positioned at the radial position RP0, the skew angle becomes, for example, 0°. Hereinafter, the radial position RP0 is called a reference position RP0 in some cases. When the head 15 is positioned at the radial position ORP, the skew angle becomes, for example, a positive value. When the head 15 is positioned at the radial position IRP, the skew angle becomes, for example, a negative value. It should be noted that when the head 15 is positioned at the radial position ORP, the skew angle may be a negative value. Further, when the head 15 is positioned at the radial position IRP, the skew angle may be a positive value.

In the example shown in FIG. 2, when the head 15 is positioned at the radial position RP0, the operation of the head 15 is corrected in such a manner as to go from the path SLO through a position above the track center ILO on the basis of the servo data of the servo pattern SV on the disk 10. When the head 15 is positioned at the radial position ORP, the operation of the head 15 is corrected in such a manner as to go from the path OSL through a position above the track center OIL on the basis of the servo data of the servo pattern SV on the disk 10. When the head 15 is positioned at the radial position IRP, the operation of the head 15 is corrected in such a manner as to go from the path ISL through a position above the track center IIL on the basis of the servo data of the servo pattern SV on the disk 10.

FIG. 3 is a view showing an example of geometric arrangement of the magnetic disk device 1 according to the embodiment. FIG. 3 shows an example of geometric arrangement of the disk 10, SPM 12, arm 13, and head 15 (read head 15R1 and read head 15R2). In FIG. 3, the center (hereinafter referred to as a disk center) DC of the disk 10, rotational center (rotational center of the head 15) PC of the arm 13 are shown. In FIG. 3, the read heads 15R1 and 15R2 are shifted from each other in the radial direction. In FIG. 3, a distance d0 between the disk center DC and rotational center PC, distance d1 between the central part of the read head 15R1 and rotational center PC, distance d2 between the central part of the read head 15R2 and rotational center PC, distance r1 between the central part of the read head 15R1 and disk center DC, distance r2 between the central part of the read head 15R2 and disk center DC, gap Gc between the central part of the read head 15R1 and central part of the read head 15R2 in the cross track direction intersecting the circumferential direction, and gap Gd between the central part of the read head 15R1 and central part of the read head 15R2 in the down track direction perpendicular to the cross track direction are shown. The distance r1 corresponds to the radial position of the read head 15R1, and distance r2 corresponds to the radial position of the read head 15R2. Accordingly, the distance r1 is called the radial position r1, and distance r2 is called the radial position r2 in some cases. The distance Gc is called a cross track gap or Cross Track Separation (CTS), and distance Gd is called a down track gap or Down Track Separation (DTS) in some cases.

Hereinafter, for convenience of explanation, the central part of the read head is simply called the read head, and central part of the write head is simply called the write head in some cases. Further, in FIG. 3, a straight line Ld0 connecting the disk center DC and rotational center PC to each other, straight line Ld1 connecting the rotational center PC and read head 15R1, straight line Ld2 connecting the rotational center PC and read head 15R2, angle α1 which the straight line Ld1 forms with the straight line Ld0, and angle α2 which the straight line Ld2 forms with the straight line Ld0 are shown. The cross track direction is, for example, a direction perpendicular to the straight line Ld1. It should be noted that cross track direction may also be a direction perpendicular to the straight line Ld2.

In FIG. 3, the distance d0, distance d1, distance d2, cross track gap Gc, down track gap Gd, angle (α2−α1), and the like can be acquired on the basis of the geometric arrangement of the disk 10, SPM 12, arm 13, head 15 (read head 15R1 and read head 15R2), and the like. By using values (hereinafter referred to as set values) corresponding to the geometric arrangement, cos(α2−α1) is expressed by the following formula.

$$\cos(\alpha 2 - \alpha 1) = \{d1^2 + d2^2 - (Gc^2 + Gd^2)\}/2d1 \times d2 \quad \text{formula (1)}$$

Further, the radial positions r1 and r2 are expressed by the following formulae.

$$r1 = \sqrt{(d0^2 + d1^2 - 2d0 \times d1 \times \cos \alpha 1)} \quad \text{formula (2)}$$

$$r2 = \sqrt{(d0^2 + d2^2 - 2d0 \times d2 \times \cos \alpha 2)} \quad \text{formula (3)}$$

A difference value Utr between the radial position r1 and radial position r2 is expressed by the following formula.

$$Utr = r2 - r1 \quad \text{formula (4)}$$

For example, the difference value Utr is a function Utr (r1) of r1. It should be noted that the difference value Utr may be a function Utr (r2) of r2. Hereinafter, a difference between the read head 15R1 and read head 15R2 in the radial direction calculated on the basis of a set value, such as the difference value Utr is called a theoretical value Utr in some cases. Further, the radial position r1 of the read head 15R1 and radial position r2 of the read head 15R2 each of which is calculated on the basis of the set value are called theoretical positions in some cases. The theoretical value Utr corresponds to an interval in the radial direction between a track read by the read head 15R1 and track read by the read head 15R2 in the case where the head 15 is positioned at a particular radial position of the disk 10. Hereinafter, the interval in the radial direction between a track read by the read head 15R1 and track read by the read head 15R2 in the case where the head 15 is positioned at a particular radial position of the disk 10 is called a read track interval.

The driver IC 20 controls drive of the SPM 12 and VCM 14 in accordance with the control of the system controller 130 (more specifically, the MPU 60 to be described later).

The head amplifier IC (preamplifier) 30 is provided with a read amplifier and write driver. The read amplifier amplifies a read signal read from the disk 10, and outputs the amplified read signal to the system controller 130 (more specifically, the read/write (R/W) channel 50 to be described later). The write driver outputs a write current corresponding to the write data to be output from the R/W channel 50 to the head 15.

The volatile memory 70 is a semiconductor memory in which the stored data is lost when electric power supplied thereto is cut off. The volatile memory 70 stores therein data or the like necessary for processing to be carried out in each unit of the magnetic disk device 1. The volatile memory 70 is, for example, a Dynamic Random Access Memory (DRAM) or Synchronous Dynamic Random Access Memory (SDRAM).

The buffer memory 80 is a semiconductor memory configured to temporarily record therein data or the like to be transmitted/received between the magnetic disk device 1 and host 100. It should be noted that the buffer memory 80 may be formed integral with the volatile memory 70. The buffer memory 80 is, for example, a DRAM, Static Random Access Memory (SRAM), SDRAM, Ferroelectric Random Access Memory (FeRAM), Magnetoresistive Random Access Memory (MRAM) or the like.

The nonvolatile memory 90 is a semiconductor memory configured to retain data stored therein even when electric power supplied thereto is cut off. The nonvolatile memory 90 is, for example, a NOR or NAND-type Flash Read Only Memory (FROM).

The system controller (controller) 130 is realized by using, for example, a large-scale integrated circuit (LSI) called a System-on-a-Chip (SoC) formed by integrating a plurality of elements into a single chip. The system controller 130 includes a hard disk controller (HDC) 40, read/write (R/W) channel 50, and microprocessor (MPU) 60. The HDC 40, R/W channel 50, and MPU 60 are electrically connected to each other. The system controller 130 is electrically connected to, for example, the driver IC 20, head amplifier IC 30, volatile memory 70, buffer memory 80, nonvolatile memory 90, host system 100, and the like.

The HDC 40 controls data transfer between the host 100 and R/W channel 50 in accordance with an instruction from the MPU 60 to be described later. The HDC 40 is electrically connected to, for example, the volatile memory 70, buffer memory 80, nonvolatile memory 90, and the like.

The R/W channel 50 executes signal processing of read data and write data in accordance with an instruction from the MPU 60. The R/W channel 50 includes a circuit or function configured to measure the signal quality of the read data. The R/W channel 50 is electrically connected to, for example, the head amplifier IC 30, and the like.

The MPU 60 is a main controller configured to control each unit of the magnetic disk device 1. The MPU 60 controls the VCM 14 through the driver IC 20, and executes servo control of carrying out positioning of the head 15. The MPU 60 controls an operation of writing data on the disk 10, and selects a storage destination of write data transferred thereto from the host 100. Further, the MPU 60 controls an operation of reading data from the disk 10, and controls processing of read data to be transferred from the disk 10 to the host 100. The MPU 60 is connected to each unit of the magnetic disk device 1. The MPU 60 is electrically connected to, for example, the driver IC 20, HDC 40, R/W channel 50, and the like.

Figure 4:
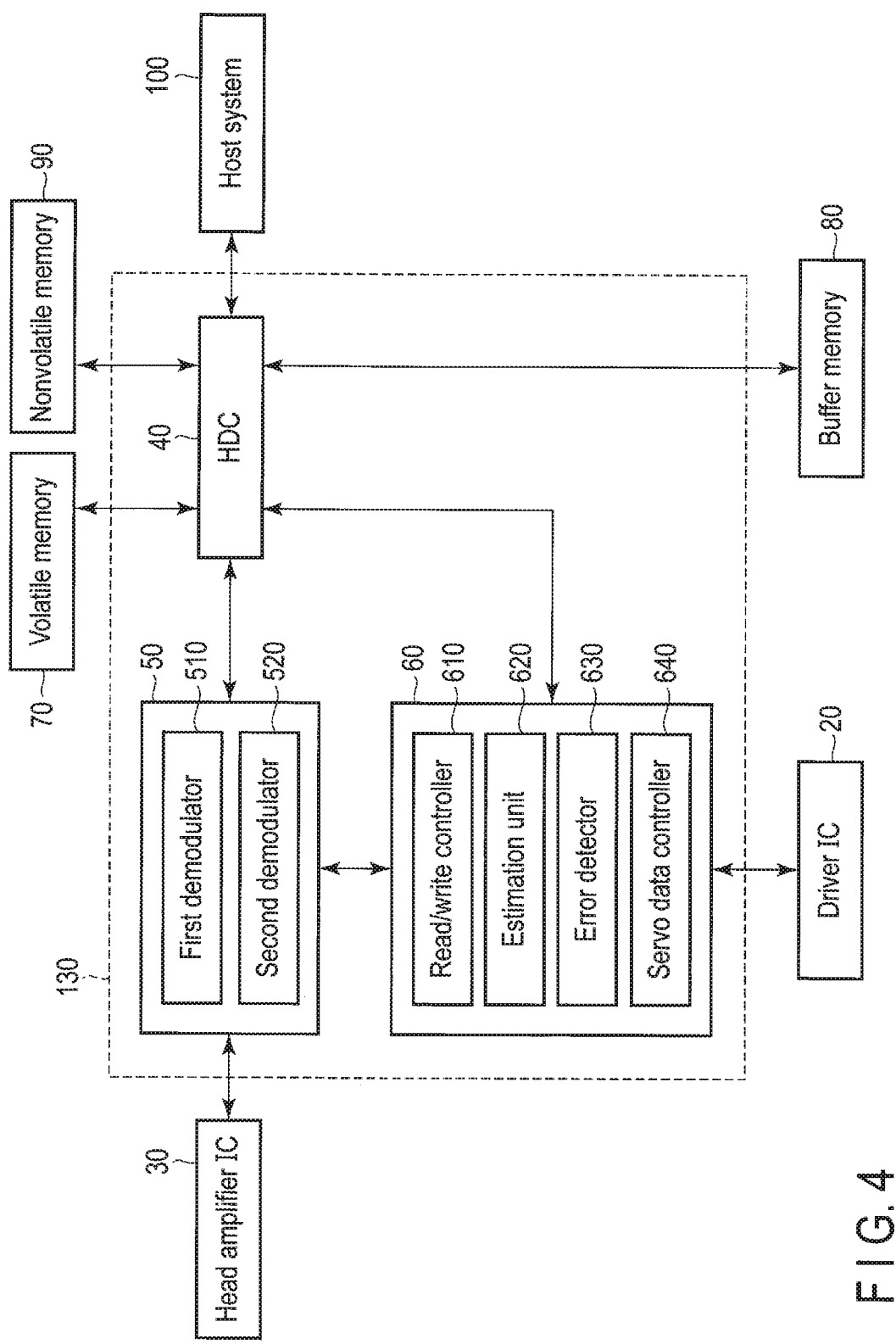
FIG. 4 is a block diagram showing configuration examples of an R/W channel and MPU according to the embodiment.

FIG. 4 is a block diagram showing configuration examples of the R/W channel 50 and MPU 60 according to the embodiment. In FIG. 4, the disk 10, arm 13, VCM 14, head 15, and the like are omitted.

The R/W channel 50 is provided with a first demodulator 510 and second demodulator 520. For example, the first demodulator 510 demodulates data read by the read head 15R1, for example, servo data, and outputs the demodulated servo data to the MPU 60 and the like. As in the case of the first demodulator 510, the second demodulator 520 demodulates servo data read by the read head 15R2, and outputs the demodulated servo data to the MPU 60 and the like. It should be noted that when three or more read heads are provided, the R/W channel 50 may be provided with three or more demodulators respectively corresponding to these read heads.

The MPU 60 is provided with a read/write controller 610, estimation unit 620, error detector 630, and servo data controller 640. The MPU 60 executes processing of these units, for example, the read/write controller 610, estimation unit 620, error detector 630, servo data controller 640, and the like on the firmware. It should be noted that the MPU 60 may be provided with these units as circuits.

The read/write controller 610 controls read processing and write processing of data in accordance with a command from the host 100. The read/write controller 610 controls the VCM 14 through the driver IC 20, positions the head 15 at a particular radial position of the disk 10 by using at least one of the read heads 15R1 and 15R2 as a reference read head, and executes read processing or write processing. The read/write controller 610 carries out positioning of the head 15 on the basis of the servo data and RRO correction data.

The estimation unit 620 estimates a change (hereinafter referred to as a change in the read track interval) in the read track interval in the radial direction of the disk 10. It should be noted that a change in the read track interval is simply called a read track interval in some cases. The estimation unit 620 calculates, for example, a change in the theoretical value (hereinafter referred to as a change in the theoretical value) in the radial direction of the disk 10 corresponding to a particular set value, and estimates a change (hereinafter referred to as a change in the object value) in the theoretical value in the radial direction corresponding to a set value (hereinafter referred to as a current set value) associated with the disk 10 and head 15 currently executing the read/write processing on the basis of the line corresponding to the change in the theoretical value. It should be noted that a change in the theoretical value is simply called a theoretical value, and a change in the object value is simply called an object value in some cases. The estimation unit 620 may record a change in the theoretical value and change in the object value in the recording region, for example, on the disk 10, in the volatile memory 70, buffer memory 80, nonvolatile memory 90, and the like.

Figure 5:
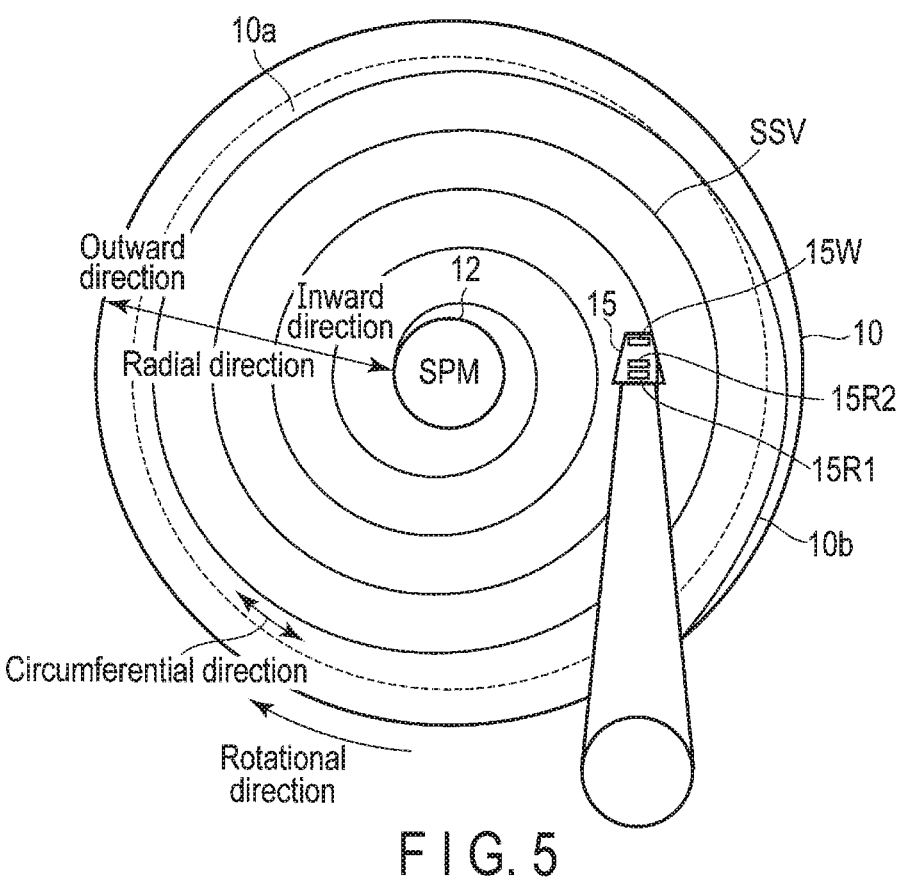
FIG. 5 is a schematic diagram showing an example of a servo pattern.

FIG. 5 is a schematic diagram showing an example of a servo pattern SSV. In FIG. 5, the servo pattern SSV is arranged in a spiral form. It should be noted that the servo pattern SSV may not be arranged in the spiral form. The servo pattern SSV includes servo data and RRO correction data.

The servo pattern SSV shown in FIG. 5 is written in, for example, the manufacturing process of the disk device 1. For example, in the magnetic disk device 1, the servo pattern SV is written by means of Self Servo Write (SSW) shown in FIG. 2 by using the servo pattern SSV shown in FIG. 5.

Figure 6:
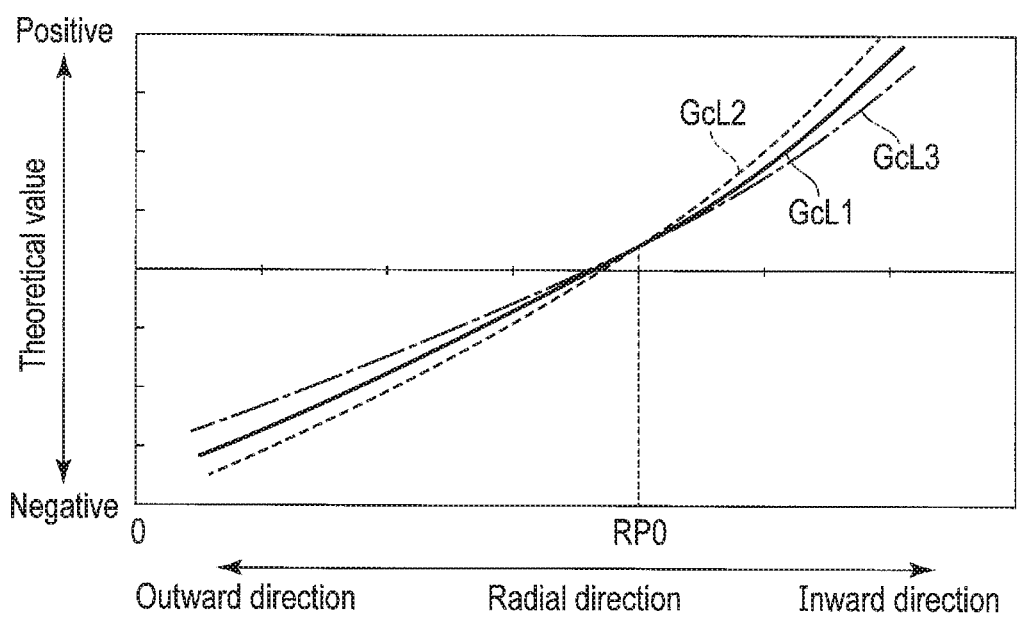
FIG. 6 is a view showing an example of a change in the theoretical value corresponding to a cross track gap.

FIG. 6 is a view showing an example of a change in the theoretical value corresponding to a cross track gap Gc. In FIG. 6, the abscissa axis indicates the radial position of a particular disk, and the ordinate axis indicates the theoretical value. The abscissa axis of FIG. 6 indicates the reference position RP0. On the abscissa axis, the greater the distance in the direction of the outward arrow, the smaller the distance to the outer circumference of the particular disk becomes and, the greater the distance in the direction of the inward arrow, the smaller the distance to the inner circumference of the particular disk becomes. On the ordinate axis, the greater the distance in the direction of the positive value arrow, the greater the theoretical value becomes and, the greater the distance in the direction of the negative value arrow, the smaller the theoretical value becomes. In other words, on the ordinate axis, the greater the distance in the direction of the positive value arrow, the greater the absolute value of the theoretical value becomes and, the greater the distance in the direction of the negative value arrow, the greater the absolute value of the theoretical values becomes. In FIG. 6, the line GcL1 indicates a change in the theoretical value of the case where the cross track gap Gc is 0. The line GcL2 indicates a change in the theoretical value of the case where the cross track gap Gc is greater than 0. The line GcL3 indicates a change in the theoretical value of the case where the cross track gap Gc is smaller than 0. As shown in FIG. 6, the line indicating a change in the theoretical value is called a theoretical value line in some cases.

In the example shown in FIG. 6, regarding each of the theoretical value lines GcL1, GcL2, and GcL3, the greater the distance in the inward direction, the greater the theoretical value becomes in the positive value direction and, the greater the distance in the outward direction, the smaller the theoretical value becomes in the negative value direction. In FIG. 6, on the outside of the reference position RP0, the theoretical value line GcL2 is positioned on the negative side of the theoretical value line GcL1, and the theoretical value line GcL3 is positioned on the positive side of the theoretical value line GcL1. On the inside of the reference position RP0, the theoretical value line GcL2 is positioned on the positive side of the theoretical value line GcL1, and the theoretical value line GcL3 is positioned on the negative side of the theoretical value line GcL1. In other words, when the skew angle is smaller than 0, a theoretical value at a particular radial position inside the theoretical value line GcL2 is smaller than a theoretical value at this radial position inside the theoretical value line GcL1 and, theoretical value at a particular radial position inside the theoretical value line GcL3 is greater than a theoretical value at this radial position inside the theoretical value line GcL1. When the skew angle is greater than 0, a theoretical value at a particular radial position inside the theoretical value line GcL2 is greater than a theoretical value at this radial position inside the theoretical value line GcL1 and, theoretical value at a particular radial position inside the theoretical value line GcL3 is smaller than a theoretical value at this radial position inside the theoretical value line GcL1.

The estimation unit 620 calculates a plurality of theoretical value lines respectively corresponding to a plurality of cross track gaps Gc. Hereinafter, for convenience of explanation, a plurality of theoretical value lines respectively corresponding to a plurality of cross track gaps Gc are called a cross track gap line group. In other words, the estimation unit 620 changes the cross track gap Gc within the particular set value to various values to thereby calculate the cross track gap line group. The estimation unit 620 records the calculated cross track gap line group in a particular recording region, for example, on the disk 10, in the volatile memory 70, buffer memory 80, nonvolatile memory 90, and the like.

Figure 7:
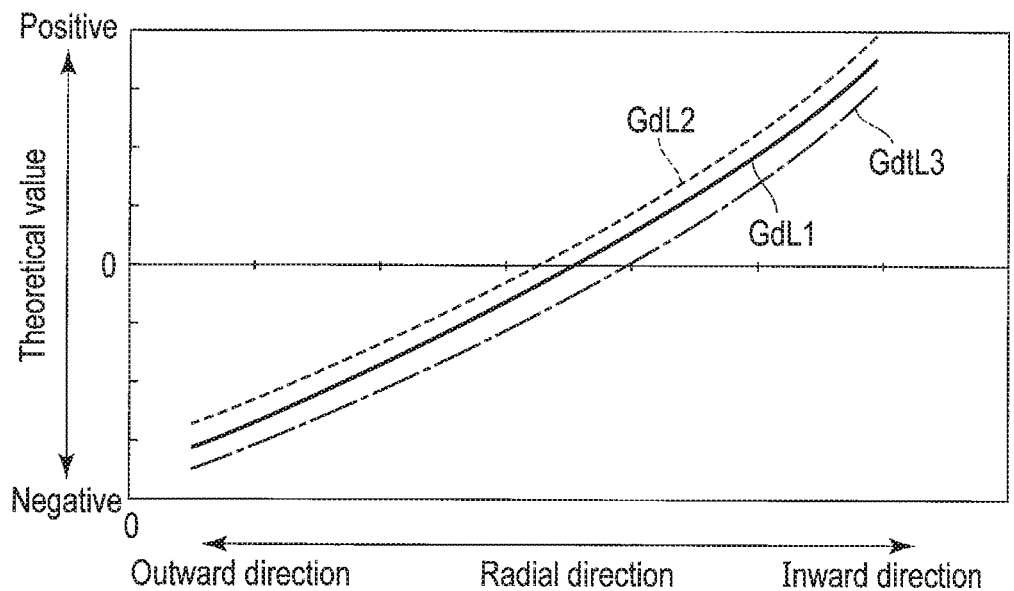
FIG. 7 is a view showing an example of a change in the theoretical value corresponding to a down track gap.

FIG. 7 is a view showing an example of a change in the theoretical value corresponding to a down track gap. In FIG. 7, the abscissa axis indicates the radial position of the particular disk, and ordinate axis indicates the theoretical value. On the abscissa axis, the greater the distance in the direction of the outward arrow, the smaller the distance to the outer circumference of the particular disk becomes and, the greater the distance in the direction of the inward arrow, the smaller the distance to the inner circumference of the particular disk becomes. On the ordinate axis, the greater the distance in the direction of the positive value arrow, the greater the theoretical value becomes and, the greater the distance in the direction of the negative value arrow, the smaller the theoretical value becomes. In FIG. 7, the line GdL1 indicates the theoretical value line of the case where the down track gap Gd is 0. The line GdL2 indicates the theoretical value line of the case where the down track gap Gd is greater than 0. The line GdL3 indicates the theoretical value line of the case where the down track gap Gd is smaller than 0.

In the example shown in FIG. 7, regarding each of the theoretical value lines GdL1, GdL2, and GdL3, the greater the distance in the inward direction, the greater the theoretical value becomes in the positive value direction and, the greater the distance in the outward direction, the smaller the theoretical value becomes in the negative value direction. In FIG. 7, the theoretical value line GdL2 is positioned on the positive side of the theoretical value line GdL1, and is located at a position obtained by shifting the theoretical value line GdL1 toward the greater positive value in the positive value direction. The theoretical value line GdL3 is positioned on the negative side of the theoretical value line GdL1, and is located at a position obtained by shifting the theoretical value line GdL1 toward the smaller negative value in the negative value direction.

The estimation unit 620 calculates a plurality of theoretical value lines respectively corresponding to a plurality of down track gaps Gd. Hereinafter, for convenience of explanation, the plurality of theoretical value lines respectively corresponding to the plurality of down track gaps Gd are called a down track gap line group. In other words, the estimation unit 620 changes the down track gap Gd within the particular set value to various values to thereby calculate the down track gap line group. The estimation unit 620 records the calculated down track gap line group in the particular recording region, for example, on the disk 10, in the volatile memory 70, buffer memory 80, nonvolatile memory 90 or the like.

Figure 8:
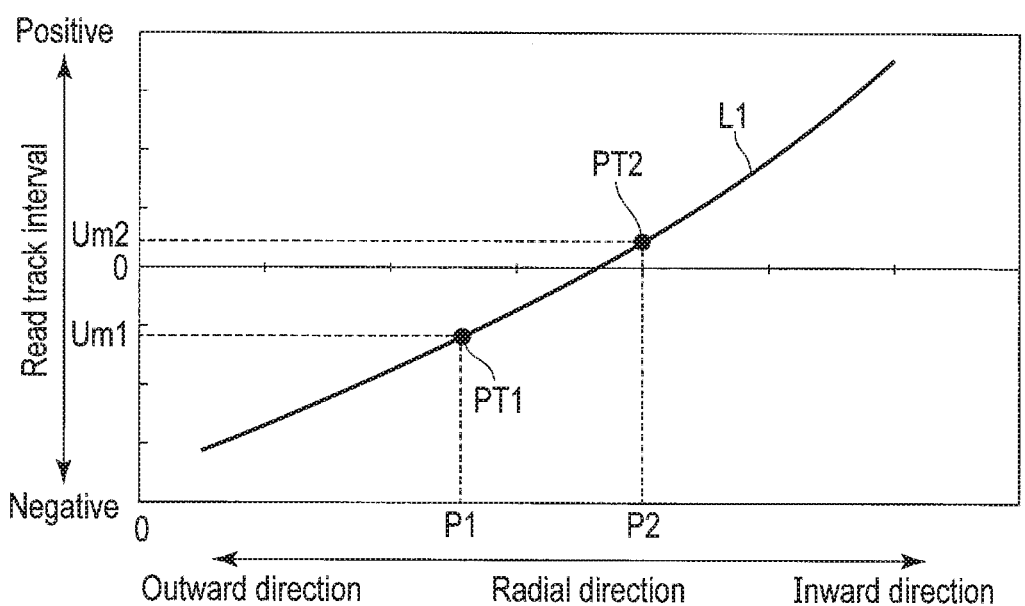
FIG. 8 is a view showing an example of a change in the object value.

FIG. 8 is a view showing an example of a change in the object value. In FIG. 8, the abscissa axis indicates the radial position of the disk, and ordinate axis indicates the read track interval. On the abscissa axis, the greater the distance in the direction of the outward arrow, the smaller the distance to the outer circumference of the disk 10 becomes and, the greater the distance in the direction of the inward arrow, the smaller the distance to the inner circumference of the disk 10 becomes. On the ordinate axis, the greater the distance in the direction of the positive value arrow, the greater the read track interval becomes and, the greater the distance in the direction of the negative value arrow, the smaller the read track interval becomes. In FIG. 8, the point PT1 indicates the read track interval Um1 detected by positioning the head 15 at the radial position P1 of the disk 10, and point PT2 indicates the read track interval Um2 detected by positioning the head 15 at the radial position P2 of the disk 10. Hereinafter, the read track interval detected by positioning the head 15 at a particular radial position of the disk 10 is called a detection value (or measurement value) in some cases. Further, the detection value detected by positioning the head 15 at the particular radial position is called a detection point in some cases. In the example shown in FIG. 8, the radial position P2 is positioned on the inner side of the radial position P1. Further, the detection value Um2 is greater than the detection value Um1. In FIG. 8, the line L1 indicates a change in the object value estimated on the basis of the detection points PT1 and PT2. As shown in FIG. 8, the line indicating the object value estimated on the basis of the detection points is called an estimation line in some cases.

In the example shown in FIG. 8, on the disk 10 on which the servo pattern SSV shown in FIG. 5 is written, the estimation unit 620 positions the head 15 at the radial position P1 on the basis of the servo pattern SSV to thereby detect the detection value Um1. The estimation unit 620 detects the down track gap Gd of the case where the head 15 is positioned at the radial position P1 on the basis of, for example, the down track gap line group shown in FIG. 7 and detection point PT1.

In the example shown in FIG. 8, the estimation unit 620 positions the head 15 at the radial position P2 of the disk 10 on which the servo pattern SSV shown in FIG. 5 is written to thereby detect the detection value Um2. The estimation unit 620 detects the cross track gap Gc of the case where the head 15 is positioned at the radial position P2 on the basis of, for example, the cross track gap line group shown in FIG. 6 and detection point PT2.

In the example shown in FIG. 8, the estimation unit 620 estimates the estimation line L1 on the basis of the detected down track gap Gd, detected cross track gap Gc, detection point PT1, and detection point PT2. The estimation unit 620 records the estimated estimation line in the particular recording region, for example, on the disk 10, in the volatile memory 70, buffer memory 80, nonvolatile memory 90 or the like.

It should be noted that the estimation unit 620 may detect the cross track gap Gc of the case where the head 15 is positioned at the radial position P1 on the basis of the cross track gap line group shown in FIG. 6 and detection point PT1. The estimation unit 620 may detect the down track gap Gd of the case where the head 15 is positioned at the radial position P2 on the basis of the down track gap line group shown in FIG. 7 and detection point PT2. The estimation unit 620 may detect the cross track gap Gc of the case where the head 15 is positioned at the radial position P1 on the basis of the cross track gap line group shown in FIG. 6 and detection point PT1. The estimation unit 620 may detect the down track gap Gd of the case where the head 15 is positioned at the radial position P1 on the basis of the down track gap line group shown in FIG. 7 and detection point PT1. The estimation unit 620 may detect the cross track gap Gc of the case where the head 15 is positioned at the radial position P2 on the basis of the cross track gap line group shown in FIG. 6 and detection point PT2. The estimation unit 620 may detect the down track gap Gd of the case where the head 15 is positioned at the radial position P2 on the basis of the down track gap line group shown in FIG. 7 and detection point PT2. Further, it is also possible to estimate the arrangement of each of the read heads 15R1 and 15R2 on the basis of the estimation line and detection points. Accordingly, the estimation line can also be used for intersection management in the manufacture of the heads.

The error detector 630 detects an error (hereinafter referred to as a track pitch error) in the track pitch in each track of the disk 10. For example, on the disk 10 on which the servo pattern SSV shown in FIG. 5 is written, the error detector 630 positions the head 15 at a particular radial position to thereby detect the detection value, and detects the track pitch error on the basis of the estimation line and detection points shown in FIG. 8. The error detector 630 detects the detection value at each radial position in the radial direction of the disk 10, and detects a change (hereinafter referred to as a change in the track pitch error) in the track pitch error in the radial direction of the disk 10 on the basis of the estimation line and detection points shown in FIG. 8. It should be noted that a change in the track pitch error is simply called a track pitch error in some cases. The error detector 630 records the detected change in the track pitch error in the particular recording region, for example, on the disk 10, in the volatile memory 70, buffer memory 80, nonvolatile memory 90 or the like.

Figure 9:
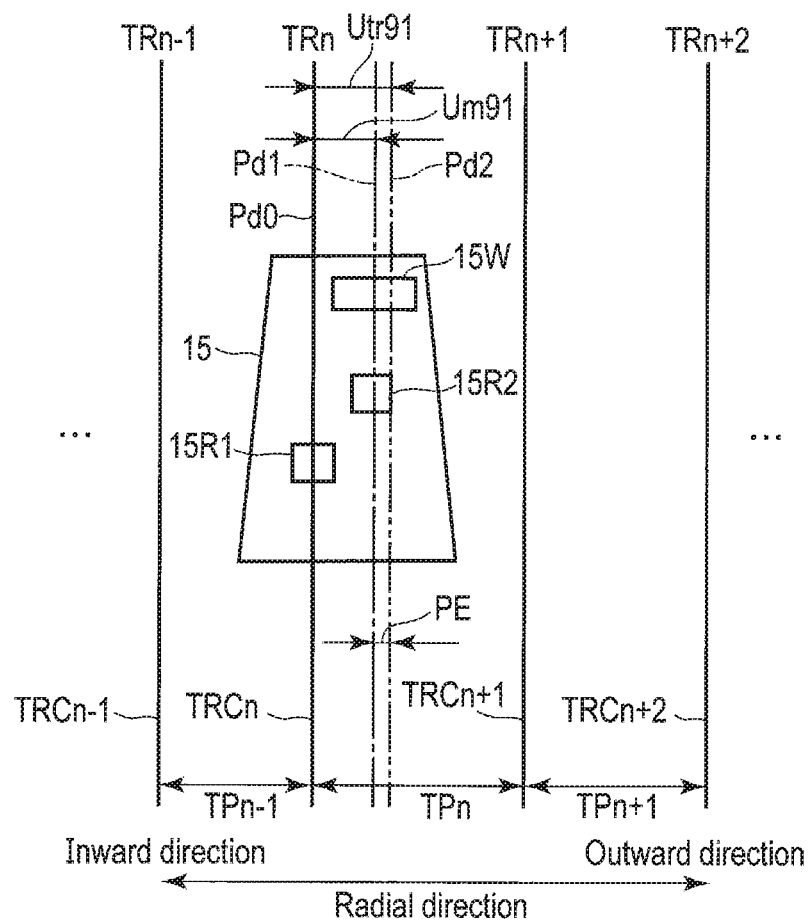
FIG. 9 is a schematic diagram showing an example of a detection method of a track pitch error.

FIG. 9 is a schematic diagram showing an example of a detection method of a track pitch error. In FIG. 9, tracks TRn−1, TRn, TRn+1, and TRn+2 which are consecutively arranged in the radial direction are shown. In FIG. 9, the track center TRCn−1 of the track TRn−1, track center TRCn of the track TRn, track center TRCn+1 of the track TRn+1, and track center TRCn+2 of the track TRn+2 are shown. In FIG. 9, the track pitch TPn−1 between the track TRn−1 and track TRn, track pitch TPn between the track TRn and track TRn+1, and track pitch TPn+1 between the track TRn+1 and track TRn+2 are shown. The track pitch TPn−1 is a distance between, for example, the track center TRCn−1 and track center TRCn, track pitch TPn is a distance between, for example, the track center TRCn and track center TRCn+1, and track pitch TPn+1 is a distance between, for example, the track center TRCn+1 and track center TRCn+2. The track center TRCn is positioned at the radial position Pd0. In FIG. 9, the head 15 positioned by arranging the read head 15R1 at the radial position Pd0 is shown. In the example shown in FIG. 9, although the head 15 is arranged in parallel with the track center TRCn for convenience of explanation, the head 15 may diagonally be arranged with respect to the track center TRCn. In FIG. 9, the radial position Pd1 of the read head 15R2 of the case where the read head 15R1 is arranged at the radial position Pd0 and the theoretical position Pd2 of the read head 15R2 of the case where the read head 15R1 is arranged at the radial position Pd0 are shown. In FIG. 9, the theoretical value Utr91 of the case where the read head 15R1 is arranged at the radial position Pd0 and detection value Um91 of the case where the read head 15R1 is arranged at the radial position Pd0 are shown.

In the example shown in FIG. 9, on the disk 10 on which the servo pattern SSV shown in FIG. 5 is written, the error detector 630 arranges the read head 15R1 at the radial position Pd0 on the basis of the servo pattern SSV to thereby position the head 15. The error detector 630 detects the detection value Um91 on the basis of the radial position Pd0 at which the read head 15R1 is arranged and radial position Pd1 at which the read head 15R2 is arranged. The error detector 630 detects the object value inside the estimation line shown in FIG. 8 and corresponding to the radial position Pd0 at which the read head 15R1 is arranged, for example, the theoretical value Utr91. The error detector 630 detects the track pitch error PE on the basis of the detection value Um91 and theoretical value Utr91. The error detector 630 detects the detection value on each track in the radial direction of the disk 10, and detects a change in the track pitch error on the basis of the estimation line and detection points shown in FIG. 8. The error detector 630 records the detected change in the track pitch error in the particular recording region, for example, on the disk 10, in the volatile memory 70, buffer memory 80, nonvolatile memory 90 or the like.

The servo data controller 640 writes servo data on the disk 10 on the basis of a change in the track pitch error. For example, on the disk 10 on which the servo pattern SSV shown in FIG. 5 is written, the servo data controller 640 writes the servo pattern SV shown in FIG. 2 on the basis of a change in the track pitch error corresponding to this disk 10.

Figure 10:
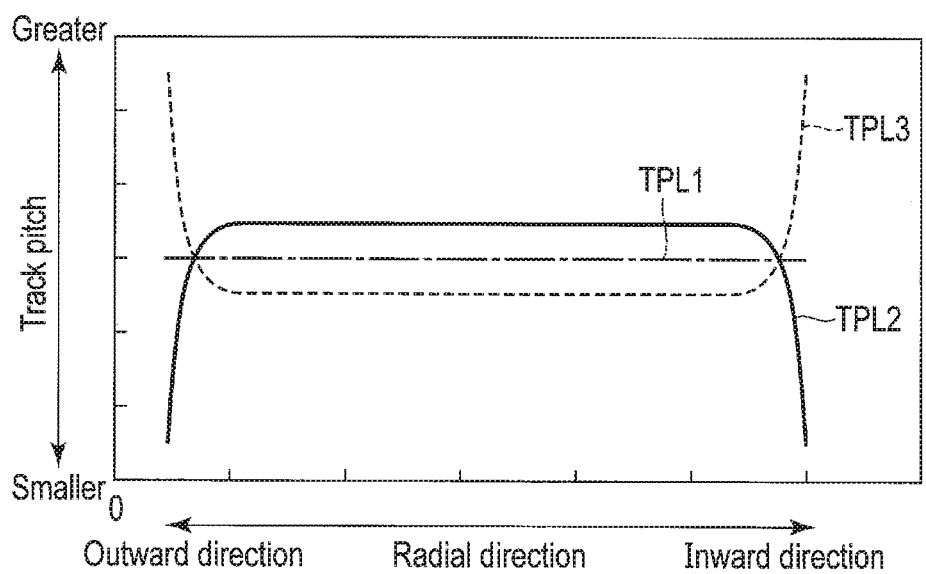
FIG. 10 is a view showing an example of a change in the track pitch.

FIG. 10 is a view showing an example of a change in the track pitch. In FIG. 10, the abscissa axis indicates the radial position of the disk 10, and ordinate axis indicates the track pitch. On the abscissa axis, the greater the distance in the direction of the outward arrow, the smaller the distance to the outer circumference of the disk 10 becomes and, the greater the distance in the direction of the inward arrow, the smaller the distance to the inner circumference of the disk 10 becomes. On the ordinate axis, the greater the distance in the direction of the arrow directed to the greater value, the greater the track pitch becomes and, the greater the distance in the direction of the arrow directed to the smaller value, the smaller the track pitch becomes. In FIG. 10, the line TPL1 indicates a fixed track pitch (hereinafter referred to as a reference track pitch) in the radial direction of the disk 10, line TPL2 indicates a change in the track pitch error relative to the reference track pitch, and line TPL3 indicates a change (hereinafter referred to as a change in the correction value) in the value (hereinafter referred to as a correction value) used to correct a change in the track pitch error of the line TPL2 to the reference track pitch. It should be noted that a change in the correction value is simply called a correction value in some cases. The change TPL3 in the correction value corresponds to, for example, an inverse of the change TPL2 in the track pitch error. As shown in FIG. 10, the line indicating the reference track pitch is called a reference track pitch line, line indicating the change in the track pitch error is called a track pitch error line, and line indicating the change in the correction value is called a correction value line.

In the example shown in FIG. 10, the servo data controller 640 calculates the correction value line TPL3 on the basis of the track pitch error line TPL2. In the radial direction of the disk 10 on which the servo pattern SSV shown in FIG. 5 is written, the servo data controller 640 writes the servo pattern SV shown in FIG. 2 while adjusting the servo pattern SV on the basis of the correction value line TPL3. By writing the servo pattern SV on the basis of the correction value line TPL3, the servo data controller 640 writes the servo pattern SV which becomes the reference track pitch TPL1 on the disk 10.

Figure 11:
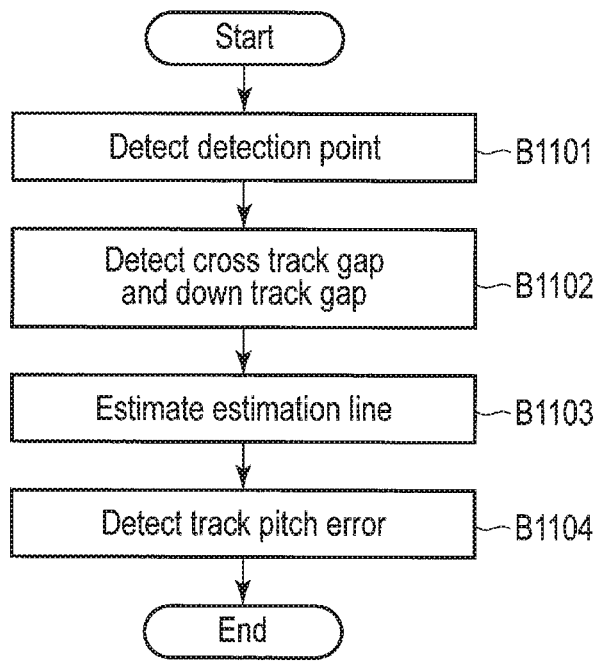
FIG. 11 is a flowchart showing an example of a detection method of a track pitch error.

FIG. 11 is a flowchart showing an example of a detection method of a track pitch error.

The MPU 60 detects a detection point (B1101). For example, the MPU 60 detects detection points at two different radial positions of the disk 10. The MPU 60 detects a cross track gap Gc and down track gap Gd (B1102). For example, the MPU 60 detects a down track gap Gd on the basis of a down track gap line group and one detection point. Further, the MPU 60 detects a cross track gap Gc on the basis of a cross track gap line group and another detection point. The MPU 60 estimates an estimation line (B1103). For example, the MPU 60 estimates an estimation line on the basis of the detected down track gap Gd, detected cross track gap Gc, and two detection points. The MPU 60 detects a track pitch error (B1104), and then terminates the processing. For example, the MPU 60 detects a change in the track pitch error on the basis of the detection value detected at each radial position of the disk 10 and estimation line, and records the detected change in the track pitch error in the particular recording region, for example, on the disk 10, in the volatile memory 70, buffer memory 80, nonvolatile memory 90 or the like, and then terminates the processing.

Figure 12:
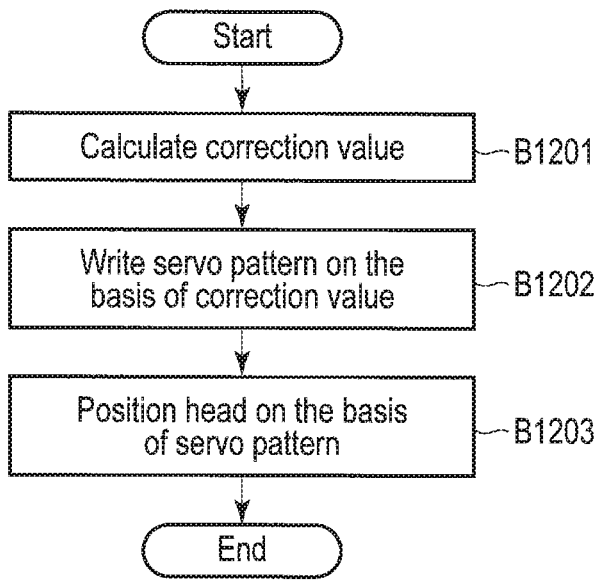
FIG. 12 is a view showing an example of a head positioning method of the embodiment.

FIG. 12 is a view showing an example of a head positioning method of this embodiment.

The MPU 60 calculates a correction value (B1201). For example, the MPU 60 calculates a correction value on the basis of a track pitch error. In one example, the MPU 60 calculates an inverse of the track pitch error as the correction value. The MPU 60 writes the servo pattern SV on the basis of the correction value (B1202). The MPU 60 positions the head 15 on the basis of the servo pattern (B1203), and then terminates the processing. For example, the MPU 60 positions the head 15 on the basis of the servo pattern SV written on the basis the correction value, and then terminates the processing.

According to this embodiment, the magnetic disk device 1 is provided with read heads 15R1 and 15R2. The magnetic disk device 1 detects an estimation line on the basis of two different detection points separately detected by means of the read heads 15R1 and 15R2, cross track gap line group, and down track gap line group. The magnetic disk device 1 detects a track pitch error on the basis of the estimation line and detection points. The magnetic disk device 1 calculates a correction value on the basis of the track pitch error. The magnetic disk device 1 writes a servo pattern SV on the basis of the correction value. The magnetic disk device 1 positions the head on the basis of the servo pattern written on the basis of the correction value. Accordingly, the magnetic disk device 1 can improve the accuracy of read/write processing. Further, the magnetic disk device 1 can correct the track pitch error by only the read processing. Accordingly, it is possible to shorten the processing time for correcting the track pitch error.

Next, a magnetic disk device according to a modification example will be described below. In the modification example, parts identical to the aforementioned embodiment are denoted by reference symbols identical to the embodiment and detailed descriptions of the parts are omitted.

Modification Example 1

A magnetic disk device 1 of the modification example 1 differs from the embodiment in that information associated with a correction value is included in the postcode.

Figure 13:
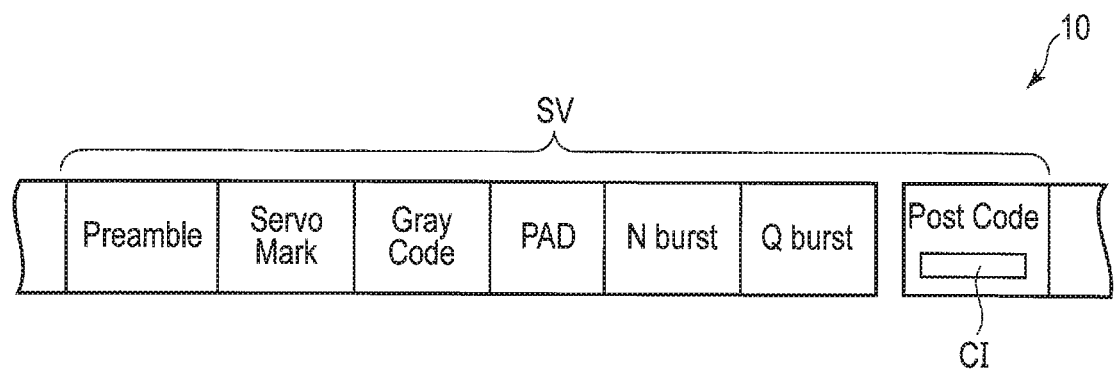
FIG. 13 is a schematic diagram showing an example of a servo pattern according to a modification example 1.

FIG. 13 is a schematic diagram showing an example of a servo pattern SV according to the modification example 1. In FIG. 13, a servo pattern SV includes a Preamble, Servo Mark, Gray Code, PAD, N burst, Q burst, and Post Code, and the like.

The MPU 60 writes the servo pattern SV shown in FIG. 2 and, thereafter detects a track pitch error again. On the disk 10 on which the servo pattern SV is written, the MPU 60 estimates an estimation line as described previously. On the disk 10 on which the servo pattern SV is written, the MPU 60 detects a track pitch error as described previously. The MPU 60 calculates a correction value on the basis of the detected track pitch error. The MPU 60 writes information (hereinafter referred to as correction value information) CI associated with the detected (calculated) correction value on the Post Code of the servo pattern SV. The MPU 60 positions the head 15 on the basis of the servo pattern SV.

Figure 14:
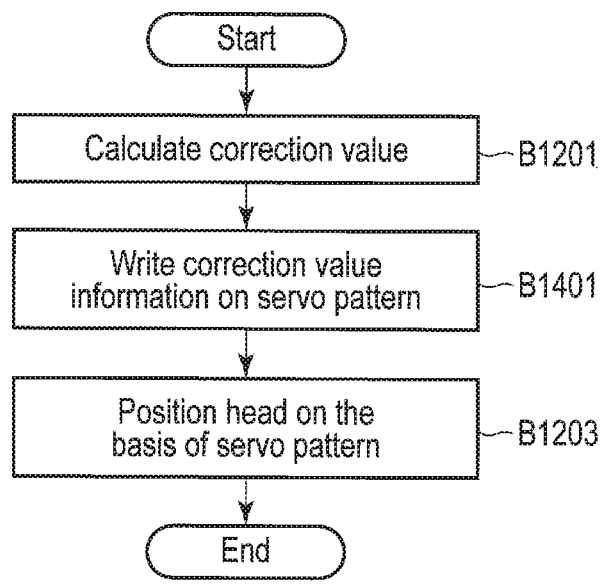
FIG. 14 is a view showing an example of a head positioning method of the embodiment.

FIG. 14 is a view showing an example of a head positioning method of this embodiment.

The MPU 60 calculates a correction value (B1201). The MPU 60 writes correction value information CI on the servo pattern (B1401). For example, the MPU 60 writes the correction value information CI on the post code. The MPU 60 positions the head 15 on the basis of the servo pattern SV (B1203), and then terminates the processing. For example, the MPU 60 positions the head 15 on the basis of the servo pattern written on the basis of the correction value, and then terminates the processing.

According to the modification example 1, the magnetic disk device 1 writes a servo pattern SV, thereafter detects an estimation line, detects a track pitch error on the basis of the estimation line and detection points, and calculates a correction value on the basis of the track pitch error. The magnetic disk device 1 writes correction value information on the post code of the servo pattern SV. The magnetic disk device 1 positions the head on the basis of the servo pattern written on the basis of the correction value. Accordingly, the magnetic disk device 1 can improve the accuracy of read/write processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a disk;
    a head including a write head configured to write data on the disk, a first read head, and a second read head each configured to read data from the disk; and
    a controller configured to detect a first error of each track pitch corresponding to each track of the disk on the basis of a first gap in a radial direction between the first read head and the second read head at each position in the radial direction of the disk, write a servo pattern on the disk on the basis of a first correction value used to correct the first error, and position the head on the basis of the servo pattern, wherein the controller calculates the first gap on the basis of a first distance between a second position in the radial direction read by the first read head and a third position in the radial direction read by the second read head at the time when the head is positioned at a first position in the radial direction, and a second distance between a fourth position in the radial direction read by the first read head and a fifth position in the radial direction read by the second read head at the time when the head is positioned at the second position in the radial direction.

2. The magnetic disk device of claim 1, wherein
the controller calculates the first error on the basis of a first difference value between a first detection position in the radial direction read by the first read head and a second detection position in the radial direction read by the second read head at each position in the radial direction, and the first gap.

3. The magnetic disk device of claim 1, wherein
the controller calculates an inverse of the first error as the first correction value.

4. The magnetic disk device of claim 1, wherein
the controller detects a second error of each track pitch corresponding to each track of the disk on the basis of a second gap in the radial direction between the first read head and the second read head at the time when the head is positioned at each position in the radial direction on the basis of the servo pattern, writes a second correction value used to correct the second error on the servo pattern, and positions the head on the basis of the servo pattern.

5. The magnetic disk device of claim 4, wherein
the controller writes the second correction value on a post code of the servo pattern.

6. The magnetic disk device of claim 4, wherein
the controller calculates the second gap on the basis of a third distance between a seventh position in the radial direction read by the first read head and an eighth position in the radial direction read by the second read head at the time when the head is positioned at a sixth position in the radial direction, and a fourth distance between a ninth position in the radial direction read by the first read head and a tenth position in the radial direction read by the second read head at the time when the head is positioned at the second position in the radial direction.

7. The magnetic disk device of claim 4, wherein
the controller calculates the second error on the basis of a second difference value between a third detection position in the radial direction read by the first read head and a fourth detection position in the radial direction read by the second read head at each position in the radial direction, and the second gap.

8. The magnetic disk device of claim 4, wherein the controller calculates an inverse of the second error as the second correction value.

9. The magnetic disk device of claim 1, wherein
the controller includes a first demodulator configured to demodulate data read by the first read head and a second demodulator configured to demodulate data read by the second read head.

10. A head positioning method to be applied to a magnetic disk device comprising a disk, and a head including a write head configured to write data on the disk, a first read head, and a second read head each configured to read data from the disk comprising:

detecting a first error of each track pitch corresponding to each track of the disk on the basis of a first gap in a radial direction between the first read head and the second read head at each position in the radial direction of the disk;

writing a servo pattern on the disk on the basis of a first correction value used to correct the first error;

positioning the head on the basis of the servo pattern; and calculating the first gap on the basis of a first distance between a second position in the radial direction read by the first read head and a third position in the radial direction read by the second read head at the time when the head is positioned at a first position in the radial direction, and a second distance between a fourth position in the radial direction read by the first read head and a fifth position in the radial direction read by the second read head at the time when the head is positioned at the second position in the radial direction.

11. The head positioning method of claim 10, further comprising:

calculating the first error on the basis of a first difference value between a first detection position in the radial direction read by the first read head and a second detection position in the radial direction read by the second read head at each position in the radial direction, and the first gap.

12. The head positioning method of claim 10, further comprising:

calculating an inverse of the first error as the first correction value.

13. The head positioning method of claim 10, further comprising:

detecting a second error of each track pitch corresponding to each track of the disk on the basis of a second gap in the radial direction between the first read head and the second read head at the time when the head is positioned at each position in the radial direction on the basis of the servo pattern;

writing a second correction value used to correct the second error on the servo pattern; and positioning the head on the basis of the servo pattern.

14. The head positioning method of claim 13, further comprising:

writing the second correction value on a post code of the servo pattern.

15. The head positioning method of claim 13, further comprising:

calculating the second gap on the basis of a third distance between a seventh position in the radial direction read by the first read head and an eighth position in the radial direction read by the second read head at the time when the head is positioned at a sixth position in the radial direction, and a fourth distance between a ninth position in the radial direction read by the first read head and a tenth position in the radial direction read by the second read head at the time when the head is positioned at the second position in the radial direction.

16. The head positioning method of claim 13, further comprising:

calculating the second error on the basis of a second difference value between a third detection position in the radial direction read by the first read head and a fourth detection position in the radial direction read by the second read head at each position in the radial direction, and the second gap.

17. The head positioning method of claim 13, further comprising:

calculating an inverse of the second error as the second correction value.

18. The head positioning method of claim 10, further comprising:

including a first demodulator configured to demodulate data read by the first read head and a second demodulator configured to demodulate data read by the second read head.

* * * * *